US012631567B2

(12) United States Patent
Zhou et al.

(10) Patent No.: US 12,631,567 B2
(45) Date of Patent: May 19, 2026

(54) SELF CALIBRATION FORMAL INSPECTION SYSTEM AND METHOD OF USING IT TO INSPECT ARTICLE

(71) Applicants: Tyco Electronics (Shanghai) Co., Ltd., Shanghai (CN); TE Connectivity Services GmbH, Schaffhausen (CH); AMP Amermex, S.A. de C.V., Chiuahua (MX)

(72) Inventors: Lei (Alex) Zhou, Shanghai (CN); Dandan (Emily) Zhang, Shanghai (CN); Roberto Francisco-Yi Lu, Bellevue, WA (US); Rong Zhang, Shanghai (CN); Angel Alberto Slistan, Sonora (MX); Jorge Enrique Clayton, Sonora (MX); Sonny O Osunkwo, Middletown, PA (US); Jiankun (Jerry) Zhou, Middletown, PA (US); Xianghao (Jorge) Bao, Shanghai (CN)

(73) Assignees: Tyco Electronics (Shanghai) Co., Ltd., Shanghai (CN); TE Connectivity Solutions GmbH, Schaffhausen (CH); AMP Amermex, S.A. de C.V., Chiauhua (MX)

( * ) Notice: Subject to any disclaimer, the term of this patent is extended or adjusted under 35 U.S.C. 154(b) by 607 days.

(21) Appl. No.: 17/731,391

(22) Filed: Apr. 28, 2022

(65) Prior Publication Data

US 2022/0349832 A1 Nov. 3, 2022

(30) Foreign Application Priority Data

Apr. 30, 2021 (CN) .......................... 202110488780.9

(51) Int. Cl.
*G01N 21/93* (2006.01)
*G01N 21/95* (2006.01)
(Continued)

(52) U.S. Cl.
CPC ........... *G01N 21/93* (2013.01); *G01N 21/952* (2013.01); *G01B 11/005* (2013.01);
(Continued)

(58) Field of Classification Search
CPC .. G01N 21/93; G01N 21/952; G01N 21/9515; G01N 21/88; G01N 21/01;
(Continued)

(56) References Cited

U.S. PATENT DOCUMENTS

| | | | | | |
|---|---|---|---|---|---|
| 4,753,569 A | * | 6/1988 | Pryor | ................... | A01B 69/008 |
| | | | | | 700/250 |
| 9,393,686 B1 | * | 7/2016 | Bradski | ................. | G06T 19/003 |

(Continued)

*Primary Examiner* — Jonathan M Dunlap
(74) *Attorney, Agent, or Firm* — Barley Snyder

(57) ABSTRACT

A self-calibrating inspection system includes an inspection device adapted to visually inspect or measure an article placed on a carrier, and a motion actuator moving the inspection device along a predetermined motion trajectory relative to the carrier and the article placed thereon. A correction member of the system is fixedly positioned with respect to the carrier. A distance sensor is fixedly positioned relative to the inspection device and adapted to sense a first spacing between the distance sensor and the correction member during the movement of the inspection device by the motion actuator. A controller communicates with the motion actuator and the distance sensor for determining a deviation between an actual motion trajectory of the inspection device moved by the motion actuator and the predetermined motion trajectory based on the first spacing, and to control the motion actuator based on the deviation to move the inspection device along a path substantially consistent with the predetermined motion trajectory.

22 Claims, 5 Drawing Sheets

(51) Int. Cl.
*G01N 21/952* (2006.01)
*G01B 11/00* (2006.01)
*G01B 21/04* (2006.01)

(52) U.S. Cl.
CPC ........ *G01B 21/042* (2013.01); *G01N 21/9515* (2013.01); *G01N 2021/9518* (2013.01)

(58) Field of Classification Search
CPC .......... G01N 2021/9518; G01B 11/005; G01B 11/00; G01B 21/042
See application file for complete search history.

(56) References Cited

U.S. PATENT DOCUMENTS

| | | | | |
|---|---|---|---|---|
| 10,099,365 | B2 * | 10/2018 | Fujita ................. | H05K 13/0812 |
| 12,036,682 | B2 * | 7/2024 | Gao ......................... | G06F 18/22 |
| 2011/0320039 | A1 * | 12/2011 | Hsu ........................ | B25J 9/1692 |
| | | | | 700/254 |
| 2015/0158176 | A1 * | 6/2015 | Fujita ................. | H05K 13/0404 |
| | | | | 700/121 |
| 2017/0274534 | A1 * | 9/2017 | Takahashi .............. | B25J 9/1692 |
| 2018/0126553 | A1 * | 5/2018 | Corkum ................. | B25J 9/1697 |
| 2018/0231474 | A1 * | 8/2018 | Yoshida ............. | G01N 21/9515 |
| 2020/0021743 | A1 * | 1/2020 | Yoshida ................. | B25J 9/1697 |
| 2021/0225607 | A1 * | 7/2021 | Chen ...................... | G01B 5/008 |

* cited by examiner

100

120

150

130

110

10

11

140

160

<u>100</u>

(a)

(b)

(c)

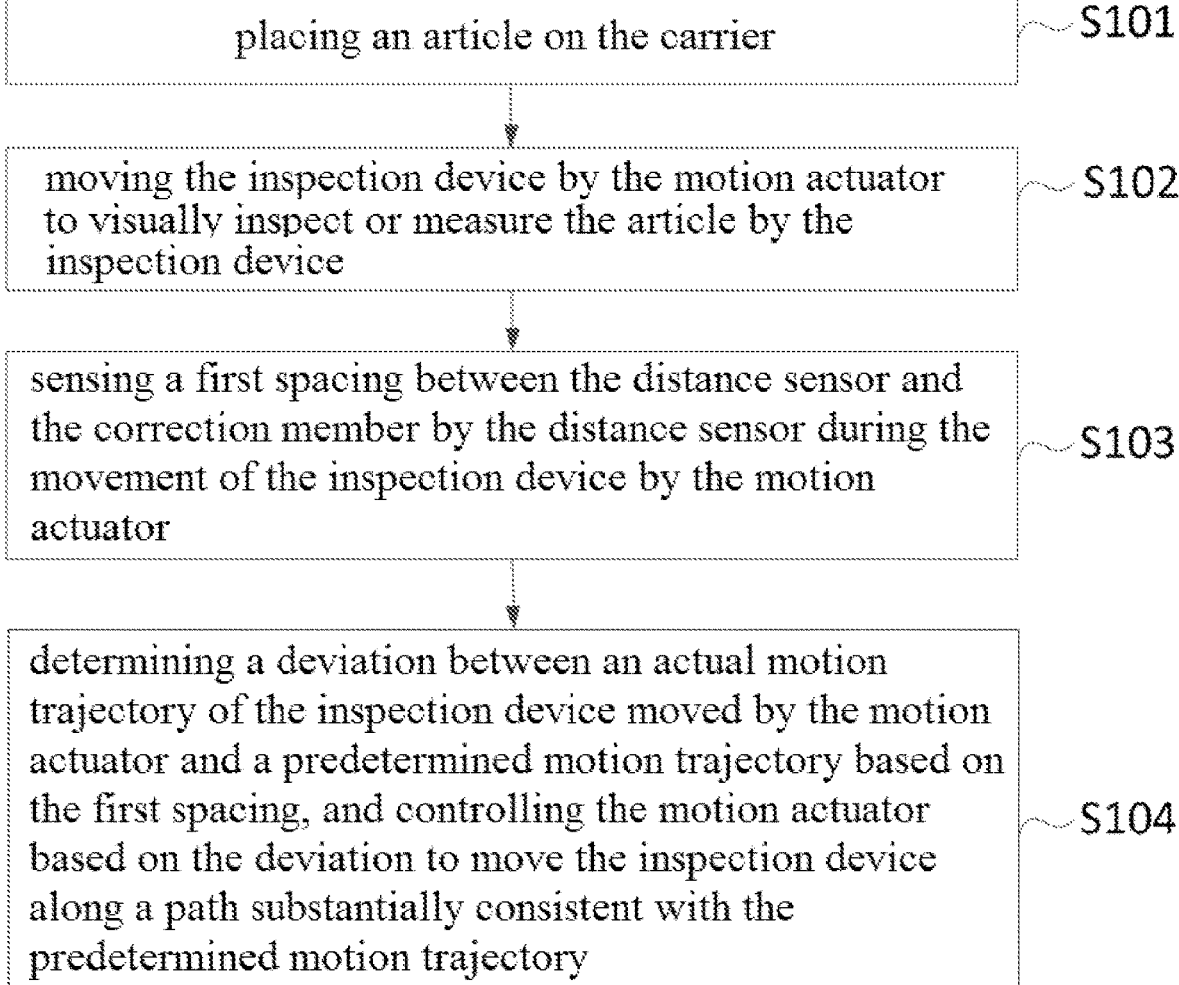

placing an article on the carrier — S101 moving the inspection device by the motion actuator to visually inspect or measure the article by the inspection device — S102 sensing a first spacing between the distance sensor and the correction member by the distance sensor during the movement of the inspection device by the motion actuator — S103 determining a deviation between an actual motion trajectory of the inspection device moved by the motion actuator and a predetermined motion trajectory based on the first spacing, and controlling the motion actuator based on the deviation to move the inspection device along a path substantially consistent with the predetermined motion trajectory — S104

Fig.5

SELF CALIBRATION FORMAL INSPECTION SYSTEM AND METHOD OF USING IT TO INSPECT ARTICLE

CROSS-REFERENCE TO RELATED APPLICATIONS

This application claims the benefit of Chinese Patent Application No. CN202110488780.9 filed on Apr. 30, 2021 in the State Intellectual Property Office of China, the whole disclosure of which is incorporated herein by reference.

FIELD OF THE INVENTION

Embodiments of the present disclosure generally relate to the field of article inspection, and more specifically, to an article inspection system and a method of inspecting or measuring an article, which are suitable for automatically correcting the motion trajectory of the inspection device relative to the article to improve the inspection accuracy.

BACKGROUND

In the prior art, a visual inspection device is usually used to inspect or measure a product or its components, for example, to check whether the product or its components have quality defects (e.g., whether there are pits, notches, etc.) or whether the size of the product or its components is qualified. Such inspection or measurement is usually carried out by moving the visual inspection device relative to the product. In practical operation, the motion trajectory of the visual inspection device relative to the product usually deviates from an expected trajectory, and the expected inspection or measurement results cannot be accurately obtained, resulting in the reduction of inspection or measurement accuracy.

SUMMARY

According to an embodiment of the present disclosure, a self-calibrating inspection system includes an inspection device adapted to visually inspect or measure an article placed on a carrier, and a motion actuator moving the inspection device along a predetermined motion trajectory relative to the carrier and the article placed thereon. A correction member of the system is fixedly positioned with respect to the carrier. A distance sensor is fixedly positioned relative to the inspection device and adapted to sense a first spacing between the distance sensor and the correction member during the movement of the inspection device by the motion actuator. A controller communicates with the motion actuator and the distance sensor for determining a deviation between an actual motion trajectory of the inspection device moved by the motion actuator and the predetermined motion trajectory based on the first spacing, and to control the motion actuator based on the deviation to move the inspection device along a path substantially consistent with the predetermined motion trajectory.

BRIEF DESCRIPTION OF THE DRAWINGS

The invention will now be described by way of example with reference to the accompanying Figures, of which:

FIG. 5 is a flowchart schematically showing a method of visually inspecting or measuring an article using a self-calibrating formal inspection system according to an exemplary embodiment of the present disclosure.

DETAILED DESCRIPTION OF THE EMBODIMENTS

Figure 1:
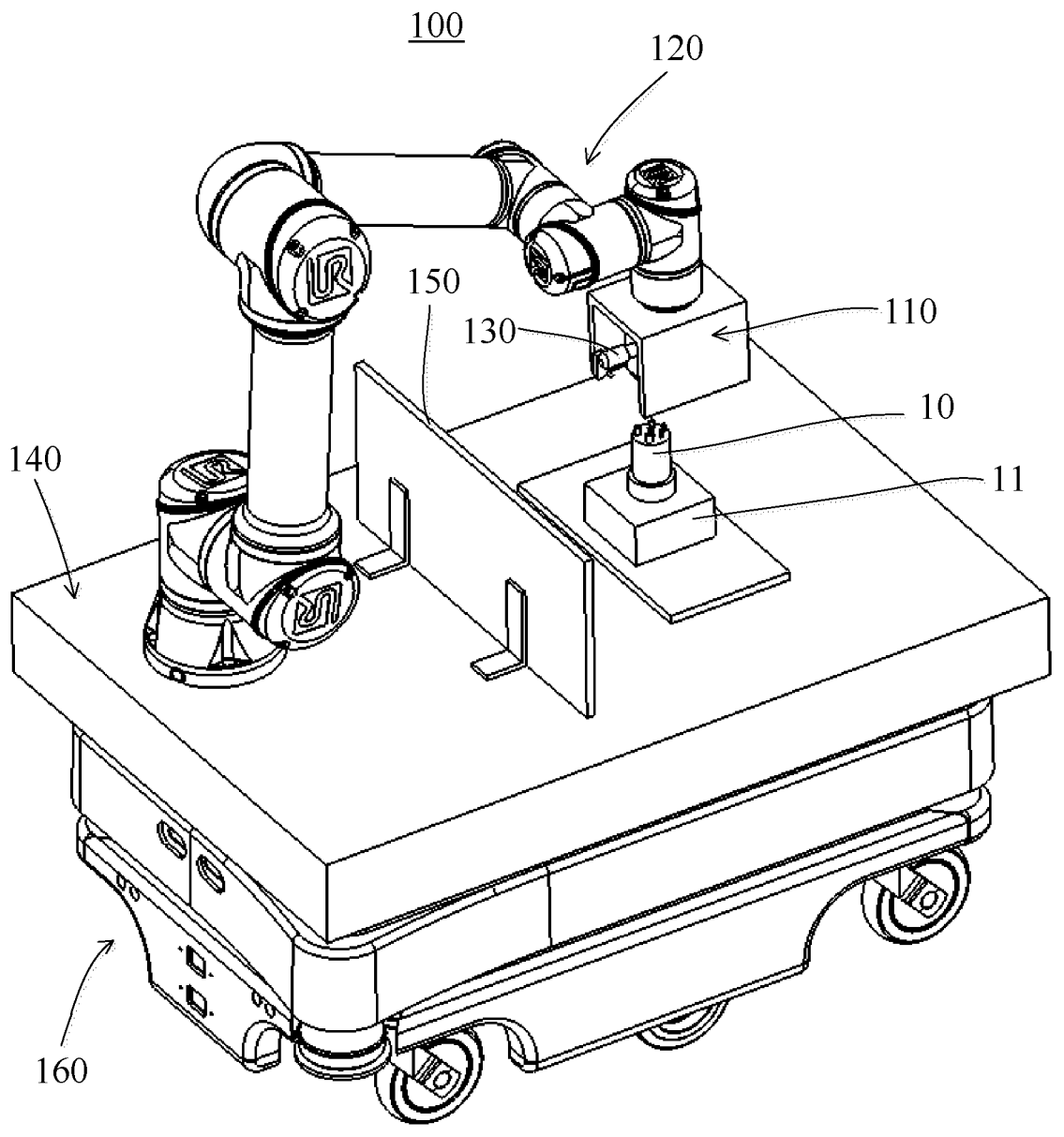
FIG. 1 is a perspective view schematically showing a self-calibrating formal inspection system according to an exemplary embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present disclosure a self-calibration or self-calibrating formal inspection system includes an inspection device configured to visually inspect or measure an article placed on a carrier, and a motion actuator configured to move the inspection device along a predetermined motion trajectory relative to the carrier and the article placed thereon. A correction member is fixedly positioned with respect to the carrier, and a distance sensor is fixedly positioned relative to the inspection device and configured to sense a first spacing between the distance sensor and the correction member during the movement of the inspection device by the motion actuator. A controller is provided for communicating with the motion actuator and the distance sensor, determining a deviation between an actual motion trajectory of the inspection device moved by the motion actuator and the predetermined motion trajectory based on the first spacing, and controlling the motion actuator based on the deviation to move the inspection device along a path substantially consistent with the predetermined motion trajectory.

According to an exemplary embodiment of the present disclosure, a self-calibration formal inspection system is provided, which is suitable for automatic correction of motion trajectory, so as to inspect articles with high accuracy, such as visual inspection or measurement of products or parts thereof.

Figure 2:
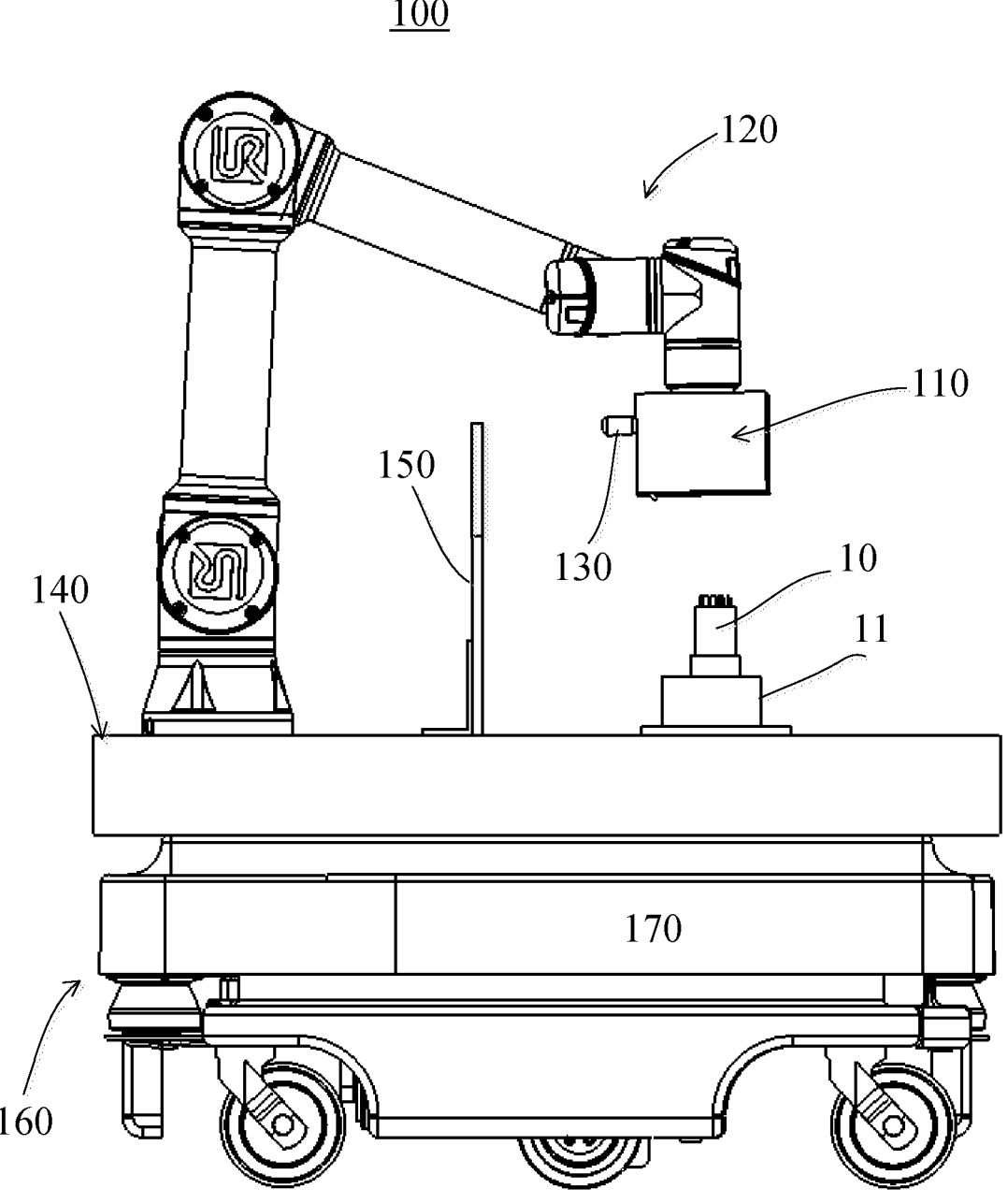
FIG. 2 is a side view schematically showing a self-calibrating formal inspection system according to an exemplary embodiment of the present disclosure.
Figure 3:
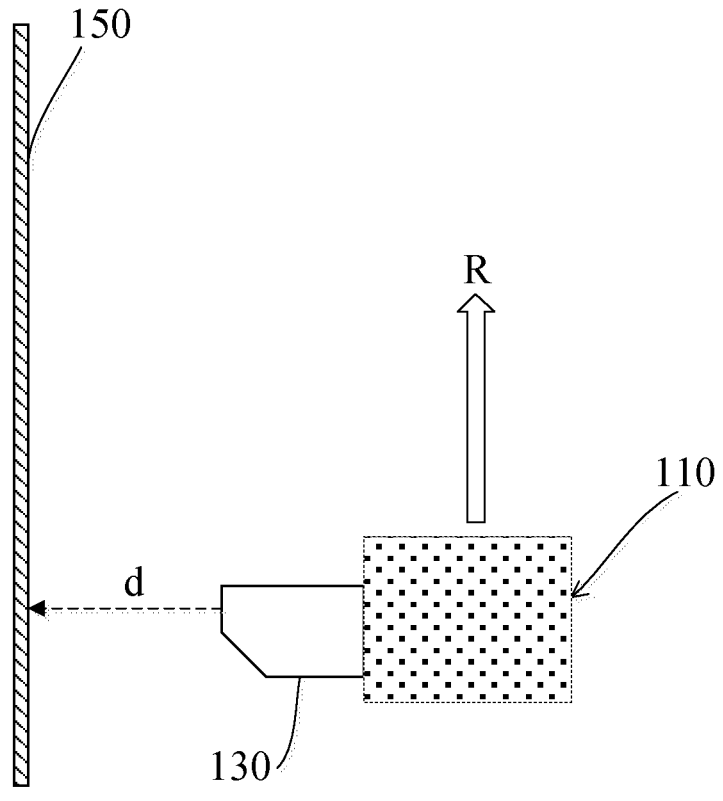
FIG. 3 is a top view schematically showing a partial configuration of a self-calibrating formal inspection system according to an exemplary embodiment of the present disclosure, in which a correction member and a distance sensor mounted to the inspection device are shown.

As shown in FIGS. 1-3, the self-calibration formal inspection system 100 includes an inspection device 110 for visual inspection or measurement of the article 10 placed on the carrier 11 or fixture. As an example, the inspection device 110 may include an imaging device or a scanning device, such as a 3D camera or a 3D scanner, which may be used to obtain an image of an article for visual inspection, size measurement, etc. of the article based on the image.

As shown in FIGS. 1-3, the self-calibration formal inspection system 100 also includes a motion actuator 120, the inspection device 110 is installed on the motion actuator 120, and the motion actuator 120 can move the inspection device 110 along a predetermined motion trajectory relative to the carrier 11 or the article 10 placed on it, so that the inspection device 110 can inspect or measure the article. As an example, the motion actuator 120 may include a robot or a movable manipulator.

According to an exemplary embodiment of the present disclosure, the self-calibration formal inspection system 100 also includes a distance sensor 130 and a correction member 150. The correction member 150 is fixedly positioned relative to the carrier 11, that is, at least during the motion actuator 120 moves the inspection device 110, the correction member 150 maintains a fixed position or spacing relationship with the carrier 11 or the article 10 placed thereon. For example, a predetermined or expected position or spacing relationship between the correction member 150 and the predetermined motion trajectory may be determined based on the position of the correction member 150 and the predetermined motion trajectory of the inspection device 110. In some examples, the position or spacing of the correction member 150 with respect to the carrier 11 may be adjusted to accommodate the inspection of different articles before inspection or measurement. For example, as shown in FIGS. 1-2, the correction member 150 may include a plate-shaped member extending in a direction substantially parallel to the predetermined motion trajectory.

The distance sensor 130 is fixedly positioned relative to the inspection device 110 so that the distance sensor 130 can move together or synchronously with the inspection device 110. In other words, the distance sensor 130 maintains a fixed position or spacing relationship with respect to the inspection device 110, so that when the inspection device 110 moves in one trajectory, the distance sensor 130 moves along the other trajectory corresponding to the one trajectory, and a fixed position or spacing relationship is maintained between the two trajectories. As an example, the distance sensor 130 may be fixedly mounted to the inspection device 110, for example, on the side of the inspection device 110 facing the correction member 150.

The distance sensor 130 is used to sense the first spacing d between the distance sensor 130 and the correction member 150 during the inspection device 110 is moved by the motion actuator 120 (e.g., in direction R), as shown in FIG. 3. As an example, the distance sensor may include an optical sensor such as an infrared sensor, a laser rangefinder, an ultrasonic sensor, and the like. Since the distance sensor 130 is fixedly positioned relative to the inspection device 110 or maintains a fixed position or spacing relationship between them, the second spacing between the inspection device 110 and the correction member 150 during movement can be determined based on the first spacing d between the distance sensor 130 and the correction member 150, and the second spacing corresponds to the actual motion trajectory of the inspection device 110.

The self-calibration formal inspection system 100 also includes a controller 170, such as a processor, which communicates with the motion actuator 120 and the distance sensor 130 to determine the deviation between the actual motion trajectory of the inspection device 110 moved by the motion actuator 120 and the predetermined motion trajectory based on the first spacing d. Further, based on the deviation, the motion actuator 120 is controlled to move the inspection device 110 along a path basically consistent with the predetermined motion trajectory to ensure the motion accuracy of the inspection device. The distance sensor 130 may measure the above spacing in real time, and the controller 170 may control the movement of the inspection device 110 by motion actuator 120 in real time based on the determined deviation. For example, the distance sensor may continuously or intermittently measure the above spacing, depending on, for example, actual inspection requirements, inspection or motion accuracy requirements, etc.

As an example, the deviation may be characterized by a change in the actual spacing between the distance sensor 130 or the inspection device 110 and the correction member 150 during movement, Alternatively, the deviation may be obtained by comparing the actual spacing between the distance sensor 130 or the inspection device 110 and the correction member 150 during movement based on the measurement of the distance sensor 130 with the predetermined or expected spacing between the correction member 150 and the predetermined motion trajectory.

The controller 170 may generate a motion compensation value based on the above deviation, and adjust the actual motion trajectory of the inspection device 110 moved by the motion actuator 120 based on the motion compensation value to basically coincide or consistent with the predetermined motion trajectory. As an example, the motion compensation value may include a reverse motion displacement for adjusting the motion trajectory of the inspection device. For example, when it is determined by the measurement of the distance sensor that the inspection device deviates a distance from the predetermined motion trajectory in one direction, the controller can generate a corresponding reverse displacement compensation value roughly the same as the distance to control the motion actuator to move the inspection device in a direction opposite to the direction by a distance basically equal to the reverse displacement compensation value. Thus, the motion of the inspection device returns to the predetermined motion trajectory.

Figure 4:
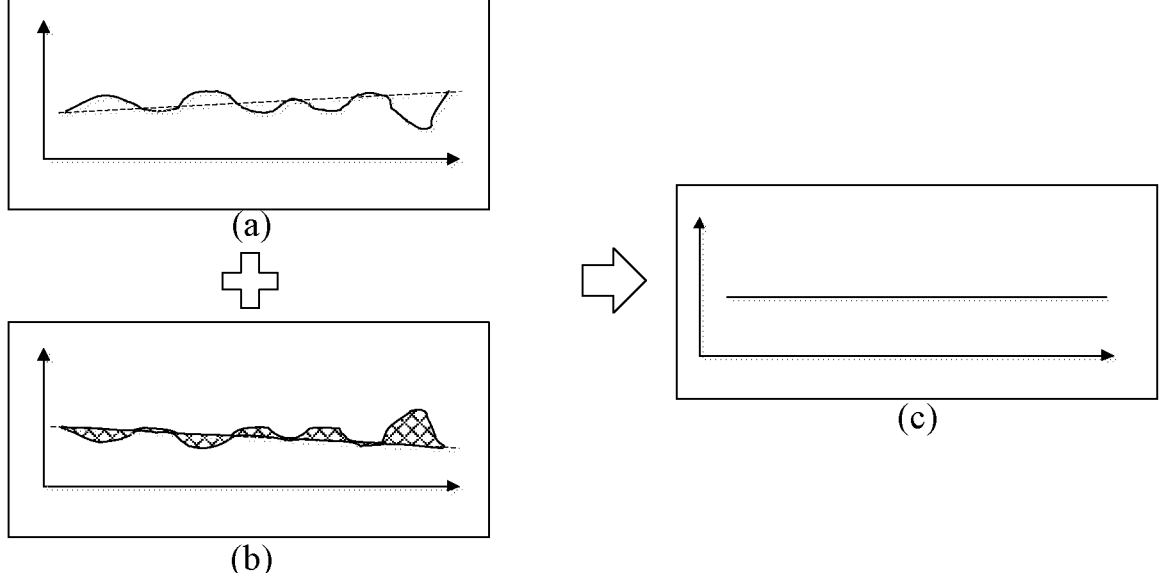
FIG. 4 is a graph schematically showing the motion trajectory of the inspection device according to the exemplary embodiment of the present disclosure, in which the correction of the actual motion trajectory of the inspection device is shown.

The curve in FIG. 4(a) shows an example of the actual motion trajectory of the inspection device moved by the motion actuator, which deviates from the expected or predetermined motion trajectory, as shown by the dotted line; The curve in FIG. 4(b) shows the motion compensation value generated by the controller, which is roughly the same in magnitude but in the opposite direction as this deviation; Thus, based on this motion compensation value, the actual motion trajectory of the inspection device moved by the motion actuator is controlled and adjusted to basically coincide or consistent with the predetermined motion trajectory, as shown in FIG. 4(c). In the illustrated embodiment, the case where the predetermined motion trajectory of the inspection device is a linear trajectory is described as an example, but the predetermined motion trajectory of the inspection device is not limited to this, but can also be set according to the inspection needs, or can include a curve trajectory.

In the embodiment shown in FIGS. 1 and 2, the motion actuator 120, the correction member 150 and the carrier 11 are mounted on the same workbench 140. In other examples, the carrier itself may include a workbench or define an inspection area. Alternatively, instead of a carrier, the article to be inspected may be placed directly in the inspection area of the workbench 140, in which case the correction member is fixedly positioned relative to the inspection area during the movement of the inspection device.

In the illustrated embodiment, the self-calibration formal inspection system 100 also includes an automatic guided vehicle (AGV) 160 or other suitable mobile carrier, and the workbench 140 may be positioned and carried on the automatic guided vehicle or carrier. The controller 170 may be arranged on the automatic guided vehicle 160, and in some examples, the controller 170 may also be used to control the movement of the automatic guided vehicle 160 to control the automatic guided vehicle 160 or the self-calibration formal inspection system 100 to move to an appropriate position according to the inspection demand.

The exemplary embodiment of the present disclosure also discloses a method for inspecting articles using such a self-calibration formal inspection system. As shown in FIG. 5, the method mainly comprises the following steps:

S101: placing the article 10 to be inspected on the carrier 11;

S102: moving the inspection device 110 by the motion actuator 120 to visually inspect or measure the article 10 by the inspection device 110, such as obtaining the image of the article or detecting the defect and size of the article;

S103: during the movement of the inspection device 110 by the motion actuator 120, the first spacing d between the distance sensor 130 and the correction member 150 is sensed by the distance sensor 130 (e.g., in real time); and S104: for example, via the controller 170, the deviation between the actual motion trajectory of the inspection device 110 moved by the motion actuator 120 and the predetermined motion trajectory is determined based on the first spacing d, and based on the deviation (e.g., in real time), the motion actuator 120 is controlled to move the inspection device 110 along a path substantially consistent with the predetermined motion trajectory.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A self-calibrating inspection system, comprising:
   an inspection device adapted to visually inspect or measure an article placed on a carrier;
   a motion actuator moving the inspection device along a predetermined motion trajectory relative to the carrier and the article placed thereon;
   a single correction member fixedly positioned with respect to the carrier between a base of the motion actuator and the carrier;
   a single distance sensor fixedly positioned relative to the inspection device physically sensing a first spacing between the distance sensor and the correction member in real time during the movement of the inspection device by the motion actuator, the distance sensor including at least one of an infrared sensor, a laser rangefinder or an ultrasonic sensor; and
   a controller communicating with the motion actuator and the distance sensor for determining a deviation between an actual motion trajectory of the inspection device moved by the motion actuator and the predetermined motion trajectory based on the first spacing.

2. The self-calibrating inspection system according to claim 1, wherein the controller adjusts the motion actuator based on the deviation to move the inspection device along a path substantially consistent with the predetermined motion trajectory.

3. The self-calibrating inspection system according to claim 2, wherein the controller generates a motion compensation value based on the deviation, and adjusts the actual motion trajectory of the inspection device moved by the motion actuator based on the motion compensation value.

4. The self-calibrating inspection system according to claim 3, wherein the controller adjusts the actual motion trajectory to substantially match the predetermined motion trajectory.

5. The self-calibrating inspection system according to claim 1, wherein the inspection device is mounted on the motion actuator, and the distance sensor is fixedly mounted on the inspection device.

6. The self-calibrating inspection system according to claim 1, wherein there is a predetermined spacing between the correction member and the predetermined motion trajectory, and the controller is configured to determine the deviation based on at least the first spacing and the predetermined spacing.

7. The self-calibrating inspection system according to claim 1, wherein the predetermined motion trajectory includes a linear trajectory or a curve trajectory.

8. The self-calibrating inspection system according to claim 1, wherein the motion actuator includes a robot or a movable manipulator.

9. The self-calibrating inspection system according to claim 1, wherein the self-calibration formal inspection system further includes a workbench.

10. The self-calibrating inspection system according to claim 9, wherein the motion actuator, the correction member and the carrier are mounted on the workbench.

11. The self-calibrating inspection system according to claim 9, further comprising an automatic guided vehicle on which the workbench is positioned and carried.

12. The self-calibrating inspection system according to claim 1, wherein the inspection device includes an imaging device or a scanning device.

13. The self-calibrating inspection system according to claim 1, wherein the correction member includes a plate-shaped member.

14. The self-calibrating inspection system according to claim 13, wherein the plate-shaped member extends in a direction substantially parallel to the predetermined motion trajectory.

15. The self-calibrating inspection system according to claim 1, wherein a second spacing between the inspection device and the correction member during movement is determined based on the first spacing.

16. The self-calibrating inspection system according to claim 15, wherein the second spacing corresponds to the actual motion trajectory of the inspection device.

17. A method for inspecting an article using a self-calibrating inspection system comprising steps of:

placing an article on a carrier;

moving an inspection device of the system via a motion actuator to visually inspect or measure the article with the inspection device;

physically sensing in real time a first spacing between a distance sensor and a correction member by the distance sensor during the movement of the inspection device by the motion actuator, the distance sensor fixedly mounted relative to the inspection device and comprising at least one of an infrared sensor, a laser rangefinder or an ultrasonic sensor, the correction member is fixedly positioned with respect to the carrier between a base of the motion actuator and the carrier; and determining a deviation between an actual motion trajectory of the inspection device moved by the motion actuator and a predetermined motion trajectory based on the first spacing.

18. The method of claim 17, further comprising the step of controlling the motion actuator based on the deviation to move the inspection device along a path substantially consistent with the predetermined motion trajectory.

19. The method according to claim 17, wherein there is a predetermined spacing between the correction member and the predetermined motion trajectory, and the step of determining a deviation includes determining the deviation based on at least the first spacing and the predetermined spacing.

20. The method according to claim 19, wherein the step of determining a deviation is performed by a controller operatively connected to the distance sensor and the motion actuator.

21. The method of claim 20, wherein the controller generates a motion compensation value based on the deviation, and adjusts the actual motion trajectory of the inspection device moved by the motion actuator based on the motion compensation value.

22. The method of claim 21, wherein the controller adjusts the actual motion trajectory to substantially match the predetermined motion trajectory.

* * * * *